United States Patent
Chen et al.

(10) Patent No.: US 12,395,411 B1
(45) Date of Patent: Aug. 19, 2025

(54) SYSTEMS AND METHODS FOR SELECTING EDGE NODES FOR TASK PERFORMANCE

(71) Applicant: Toyota Motor Engineering & Manufacturing North America, Inc., Plano, TX (US)

(72) Inventors: Dawei Chen, Milpitas, CA (US); Qi Chen, San Jose, CA (US); Rohit Gupta, Santa Clara, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 24 days.

(21) Appl. No.: 18/433,759

(22) Filed: Feb. 6, 2024

(51) Int. Cl.
*H04L 41/00* (2022.01)
*H04L 41/50* (2022.01)
*H04W 4/40* (2018.01)

(52) U.S. Cl.
CPC ............ *H04L 41/30* (2013.01); *H04L 41/508* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 6,791,472 B1* | 9/2004 | Hoffberg | ............ | H04B 7/18576 340/995.13 |
| 7,813,991 B1* | 10/2010 | Keith | ................... | G06Q 10/087 705/28 |
| 9,807,239 B1* | 10/2017 | Wu | ...................... | H04M 3/5235 |
| 9,860,391 B1* | 1/2018 | Wu | ................... | H04M 15/8061 |
| 10,718,031 B1* | 7/2020 | Wu | ......................... | H04M 3/51 |
| 11,412,061 B1* | 8/2022 | Guo | ........................ | H04L 67/60 |
| 2002/0138399 A1* | 9/2002 | Hayes | .................... | G06Q 40/04 705/37 |
| 2004/0010592 A1* | 1/2004 | Carver | .................. | H04L 47/805 709/226 |
| 2006/0167703 A1* | 7/2006 | Yakov | .................. | B23K 1/0016 705/37 |

(Continued)

FOREIGN PATENT DOCUMENTS

| | | |
|---|---|---|
| CN | 109656703 A | 4/2019 |
| CN | 112512013 A | 3/2021 |

(Continued)

*Primary Examiner* — Phyllis A Book
(74) *Attorney, Agent, or Firm* — Dinsmore & Shohl LLP (57) ABSTRACT

Systems and methods for selecting an edge node include a processor operable to send a request of bidding to edge nodes regarding performing a task for an inquiry vehicle, receive one or more bids from one or more bidding edge nodes of the edge nodes, wherein each bid includes a resource allocation offer and a price, calculate a preference value based on a weighted sum of preference factors for each bidding edge node, wherein the preference factors are determined based on the resource allocation offer, and the weight assigned to each preference factor is determined based on the task, select a performing edge node based on the preference values and the prices, and operate the inquiry vehicle based on a result of the task performed by the performing edge node.

15 Claims, 6 Drawing Sheets

(56) References Cited

U.S. PATENT DOCUMENTS

| | | | | |
|---|---|---|---|---|
| 2014/0081793 | A1* | 3/2014 | Hoffberg | G06Q 30/0207 |
| | | | | 705/26.3 |
| 2015/0111591 | A1* | 4/2015 | Hoffberg | G06Q 20/065 |
| | | | | 455/452.1 |
| 2017/0235848 | A1* | 8/2017 | Van Dusen | G06Q 10/101 |
| | | | | 705/12 |

FOREIGN PATENT DOCUMENTS

| | | |
|---|---|---|
| CN | 112799833 A | 5/2021 |
| CN | 113377516 A | 9/2021 |
| CN | 109379727 B | 10/2021 |
| CN | 112328397 B | 10/2022 |
| DE | 102020101704 A1 | 8/2020 |

\* cited by examiner

SYSTEMS AND METHODS FOR SELECTING EDGE NODES FOR TASK PERFORMANCE

TECHNICAL FIELD

The present disclosure relates to systems and methods for distributed computing, more specifically, to systems and methods for selecting edge nodes for distributed computing.

BACKGROUND

The augmentation of computing resources enhances the capabilities and fulfills the requirements of local devices. Edge computing nodes, such as smart mobile devices and multi-access servers, offer users the ability to proficiently offload computing tasks onto external resources. Consequently, there is a need of a system and method for users to select external computing resources, including edge nodes, employing a bidding mechanism.

SUMMARY

In one embodiment, a system for selecting an edge node include a processor operable to send a request of bidding to edge nodes regarding performing a task for an inquiry vehicle, receive one or more bids from one or more bidding edge nodes of the edge nodes, wherein each bid includes a resource allocation offer and a price, calculate a preference value based on a weighted sum of preference factors for each bidding edge node, wherein the preference factors are determined based on the resource allocation offer, and the weight assigned to each preference factor is determined based on the task, select a performing edge node based on the preference values and the prices, and operate the inquiry vehicle based on a result of the task performed by the performing edge node.

In another embodiment, a method for selecting an edge node including sending a request of bidding to edge nodes regarding performing a task for an inquiry vehicle, receiving one or more bids from one or more bidding edge nodes of the edge nodes, wherein each bid includes a resource allocation offer and a price, calculating a preference value based on a weighted sum of preference factors for each bidding edge node, wherein the preference factors are determined based on the resource allocation offer, and the weight assigned to each preference factor is determined based on the task, selecting a performing edge node based on the preference values and the prices; and operating the inquiry vehicle based on a result of the task performed by the performing edge node.

In a third embodiment, a system for resource allocation includes a plurality of inquiry vehicles and a plurality of edge nodes. Each inquiry vehicle is operable to send a request of bidding to the edge nodes regarding performing a task for corresponding vehicle, calculate a preference value based on a weighted sum of preference factors for each edge node, wherein the preference factors are based on resource allocation offers sent from the edge nodes, and the weights are based on the task, select a performing edge node of the plurality of edge nodes to perform the task based on the preference values and prices sent from the edge nodes, and operate the inquiry vehicle based on a result of the task performed by the performing edge node. Each of the plurality of edge nodes is operable to generate a resource allocation blueprint based on available resources, the resource allocation blueprint comprising the resource allocation offers, determine the price for each task based on the resource allocation blueprint and an expected revenue, perform the task after receiving, from a corresponding inquiry vehicle, a confirmation that a corresponding edge node is selected as the performing edge node, and send the result of the performed task to the corresponding inquiry vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments presented in this disclosure encompass advanced systems and methodologies designed for the strategic selection of an edge node to optimize task performance and facilitate the allocation of computing resources across diverse edge nodes. These edge nodes exhibit heterogeneity, incorporating an array of computing objects such as smart mobile devices and multi-access servers deployed by telecommunications vendors. The complexity of these edge environments necessitates a method or system to proficiently manage computing resources, particularly in a context-aware fashion.

In the context-aware approach disclosed herein, the goal is to enhance the efficiency of computing resource distribution while simultaneously addressing user requirements, including factors such as monetary cost, computation capability, service period, and more. The disclosed systems and methods offer distinct advantages over centralized approaches. Unlike centralized methods, which rely on a central management hub to collect extensive information from a multitude of edge nodes for timely management and allocation, the presented systems and methods streamline the process by enabling distributed decision-making at the edge. The disclosed systems and methods empower individual edge nodes to assess and respond to their unique contextual factors, resulting in a more agile and responsive computing resource allocation. This approach not only improves efficiency but also reduces the burden on a central hub, avoiding potential bottlenecks associated with information collection and decision dissemination. Consequently, this distributed model ensures a more dynamic and contextually aware computing resource management system, capable of adapting to the diverse and evolving demands of users (e.g., price meeting the budget requirements and allocated resources meeting the efficiency requirements).

Various embodiments of the methods and systems selecting edge nodes for task performance are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 1:
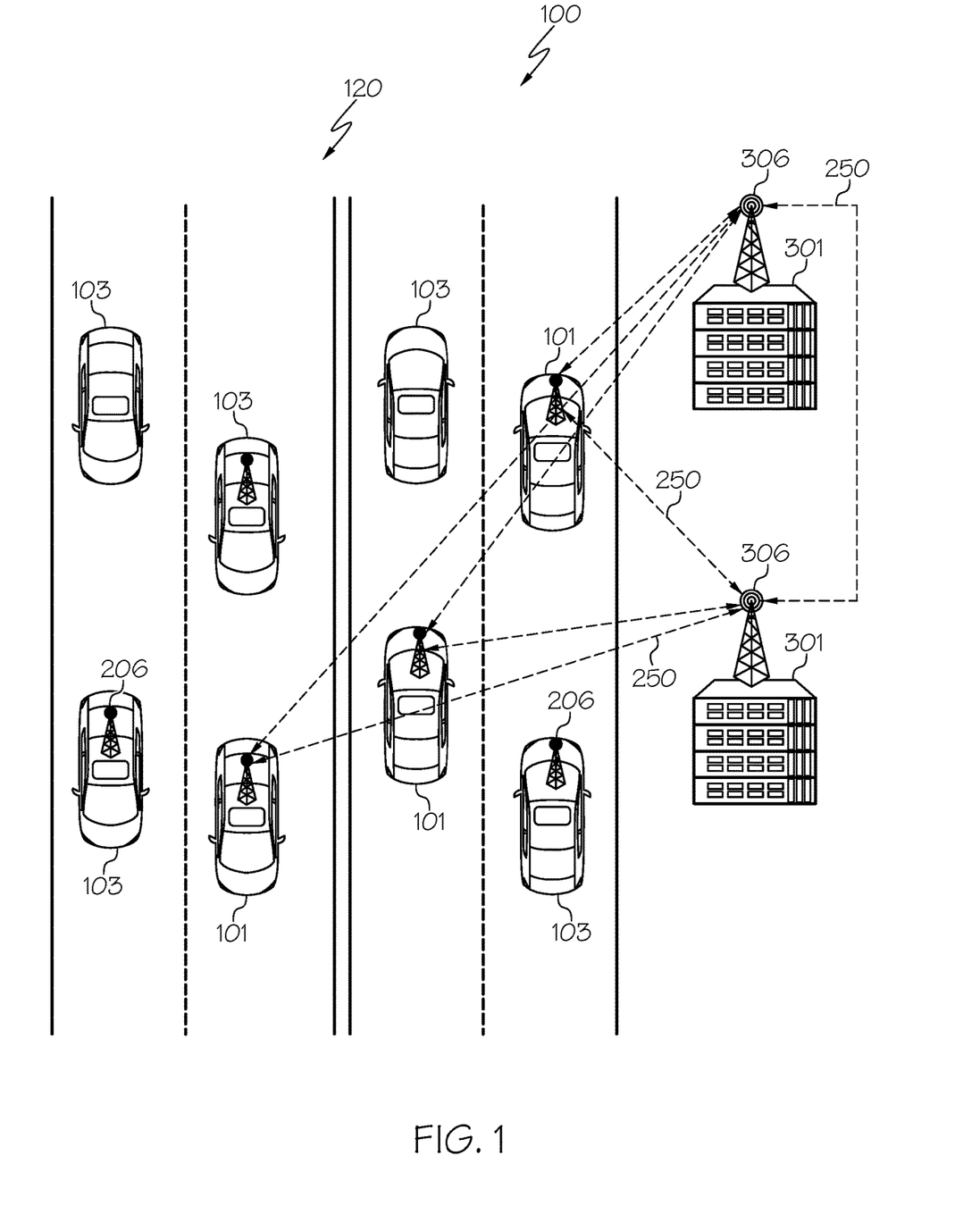
FIG. 1 schematically depicts an example system for selecting an edge node for task performance of the present disclosure, in accordance with one or more embodiments shown and described herewith.

FIG. 1 schematically depicts an example edge node selection system 100. The edge node selection system 100 includes a plurality of vehicles 101 and 103. Each vehicle includes a communication device, such as vehicle network interface hardware 206, operable to wirelessly communicate with external computing resources, such as edge nodes 301. The system may further include one or more edge nodes 301 including server communication devices, such as server network interface hardware 306, operable to communicate with the plurality of vehicles 101 and 103.

Each of the vehicles 101 and 103 may be an automobile or any other passenger or non-passenger vehicle such as, for example, a terrestrial, aquatic, and/or airborne vehicle. Each of the vehicles 101 and 103 may be an autonomous vehicle that navigates its environment with limited human input or without human input. Each of the vehicles 101 and 103 may drive on a road 120, with one or more edge nodes 301 near the vehicles 101 and 103. Each of the vehicles 101 and 103 may include actuators for driving the vehicle, such as a motor, an engine, or any other powertrain. The vehicles 101 and 103 may move or appear on various surfaces, such as, without limitations, roads, highways, streets, expressway, bridges, tunnels, parking lots, garages, off-road trails, railroads, or any surfaces where the vehicles may operate.

In embodiments, the plurality of vehicles 101 and 103 includes one or more inquiry vehicles 101, and one or more non-inquiry vehicles 103. Each inquiry vehicle 101 may send a request of bidding to one or more edge nodes 301 regarding performing a task. In embodiments, each of the inquiry vehicle 101 may include a network interface hardware 206 and communicate with each other via wireless communications 250. The inquiry vehicle 101 may transmit, without limitations, the request of bidding, a negotiation price, and a request for contract forming. In some embodiments, the edge nodes 301 provides services to only the inquiry vehicles. The non-inquiry vehicles 103 may not transmit any request of bidding or other data to the edge nodes 301, regardless the non-inquiry vehicles 103 include a network interface hardware 206 that allows the non-inquiry vehicles 103 to communicate with the edge nodes 301. In some embodiments, an inquiry vehicle 101 may become a non-inquiry vehicle 103 when the task is performed by one of the edge nodes 301 and the results are received by the inquiry vehicle 101. Similarly, a non-inquiry vehicle 103 may become an inquiry vehicle 101 when the non-inquiry vehicle 103 has a task for bidding to be performed by the edge nodes 301. In some embodiments, the inquire vehicle 101 may be a user using a smartphone, a computer, a tablet, or a digital device that requires data processing when the user is away from the vehicle.

The inquiry vehicle 101 may send a request of bidding to edge nodes 301 regarding performing a task. The task may be, without limitations, of responsibilities to enhance the efficiency and responsiveness of the vehicle's operation, or of enabling augmented reality (AR) applications within vehicles. The task may be any task for autonomous driving including, but not limited to, object detection, object classification, training a machine learning model, and the like. For example, the inquiry vehicle 101 may request a task involving processing of sensor data (encompassing activities such as preprocessing and filtering data from various sensors like cameras, LiDAR, and radar, object detection), decision-making for immediate navigation responses, collision avoidance, traffic management (executing real-time analysis of local traffic conditions and optimizing routes accordingly), communication protocols, security functions, and energy management. The tasks to be performed by the edge nodes 301 may ensure that the operations of tasks are performed locally or decentralized, thereby reducing latency and dependencies on the central cloud. The deployment of edge computing in inquiry vehicles 101 thus facilitates quicker decision-making and improved overall system performance. In some embodiments, the tasks may further include data processing involving enabling AR applications within vehicles, enhancing the user experience for both drivers and passengers. For example, the tasks may involve rendering graphical user interfaces, processing AR overlays based on sensor data, and contributing to the vehicle's map with real-time updates. In some embodiments, the edge nodes 301 may also address privacy concerns by interacting with the inquiry vehicles 101 to process sensitive information and compress data before transmission to the central cloud, ensuring a balance between data-driven functionality and privacy preservation.

Figure 2:
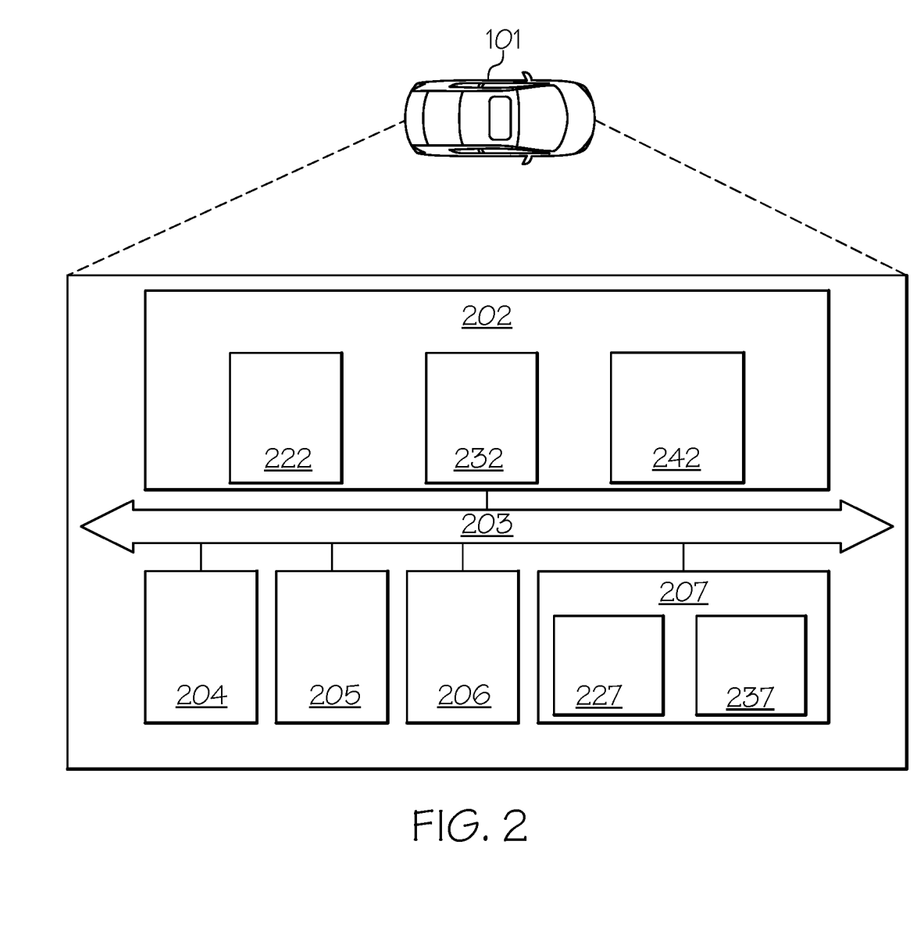
FIG. 2 schematically depicts example components of an inquiry vehicle of the present disclosure, according to one or more embodiments shown and described herein.

The inquiry vehicle 101 and the non-inquiry vehicles 103 may include one or more vehicle modules, including, without limitations, a task and bid request module 222, a preference value module 232, and a performing edge node selection module 242 in FIG. 2. The one or more modules may be utilized by vehicles in operating the vehicles in sending to and receiving from the edge nodes 301 during the computing distribution selection process.

The edge nodes 301 are devices and/or servers placed close to the source of data (e.g., vehicles) to enable faster processing and decision-making. The edge nodes 301 may provide computational task performance locally and reduce the needs to transmit large volumes of data to centralized cloud. The edge nodes 301 may be, without limitations, smartphones, tablets, edge servers, telematics servers, fleet management servers, connected car platforms, application servers, Internet of Things (IoTs) servers, or any server with capability to transmit data with vehicles. The edge node 301 may include server network interface hardware 306 and communicate with the inquiry vehicles 101 and other edge nodes 301 via wireless communications 250. The edge node 301 may store a resource allocation module 322 in FIG. 3 for resource allocation within each edge node and among the edge nodes 301. The edge node 301 may include a price module 332 in FIG. 3 to generate a bidding price for a received task based on allocated resources to perform the received task and historical price and performance information of relevant or similar tasks and/or vehicles. Each edge node 301 may generate a bid for the received task inquiry. Each bid may include a resource allocation offer and a price. In some embodiments, some edge nodes 301 may send multiple proposed bids to allow the inquiry vehicle 101 to select one of the bids to balance between the allocated resources and the price. One edge node 301 may send multiple bids when limited edge nodes 301, such as less than 10 edge nodes 301, 8 edge nodes 301, 6 edge nodes 301, 4 edge nodes 301, 2 edge nodes 301, or only one edge node 301, are available for the inquire vehicle 101 to request for task performance.

Each of the vehicle modules and the server modules may include one or more machine-learning algorithms. The vehicle modules and the server modules may be trained and provided with machine-learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tan h function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one-to-one, one-to-many, many-to-one, and/or many-to-many (e.g., sequence-to-sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in the field of machine learning, for example, is a class of deep, feed-forward ANNs applied for audio analysis of the recordings. CNNs may be shift or space-invariant and utilize shared-weight architecture and translation. Further, each of the various modules may include a generative artificial intelligence algorithm. The generative artificial intelligence algorithm may include a general adversarial network (GAN) that has two networks, a generator model and a discriminator model. The generative artificial intelligence algorithm may also be based on variation autoencoder (VAE) or transformer-based models.

The one or more vehicle modules, the task and bid request module 222, the preference value module 232, and the performing edge node selection module 242, may be pre-trained using training data of the edge node-vehicle bidding, including ground-truth examples and scenarios where multiple entities (e.g., inquiry vehicles 101) sending inquiry tasks to the edge nodes 301 while the edge nodes 301 may conduct bidding and allocate corresponding resources to satisfy the inquiry tasks such that the inquiry task from each vehicle may be satisfied in terms of the allocated resources and the cost of task performance. The pre-training may include labeling the entities and desirable edge node-vehicle bidding results in the examples and scenarios and using one or more neural networks to learn to predict the desirable and undesirable allocated resource and price results based on the training data. The pre-training may further include fine-tuning, evaluation, and testing steps. The one or more vehicle modules may be continuously trained using the real-world collected data to adapt to changing conditions and factors and improve performance over time.

Similar to the vehicle modules, the resource allocation module 322 and the price module 332 may be pre-trained using training data of the edge node-vehicle bidding. The pre-training may include labeling sample data and using one or more neural networks to learn to predict the desirable and undesirable allocated resources and price results based on the training data. The pre-training may further include fine-tuning, evaluation, and testing steps. The resource allocation module 322 and the price module 332 may be continuously trained using the real-world collected data to adapt to changing conditions and factors and improve performance over time.

The wireless communication 250 may connect various components, the vehicles 101 and 103, and/or the edge node 301 of the edge node selection system 100 and allow signal transmission between the various components, the vehicles, and/or the edge node 301 of the edge node selection system 100. In some embodiments, the wireless communications 250 may facilitate the transmission of wireless signals, such as WiFi, Bluetooth®, Near Field Communication (NFC) and the like.

Figure 3:
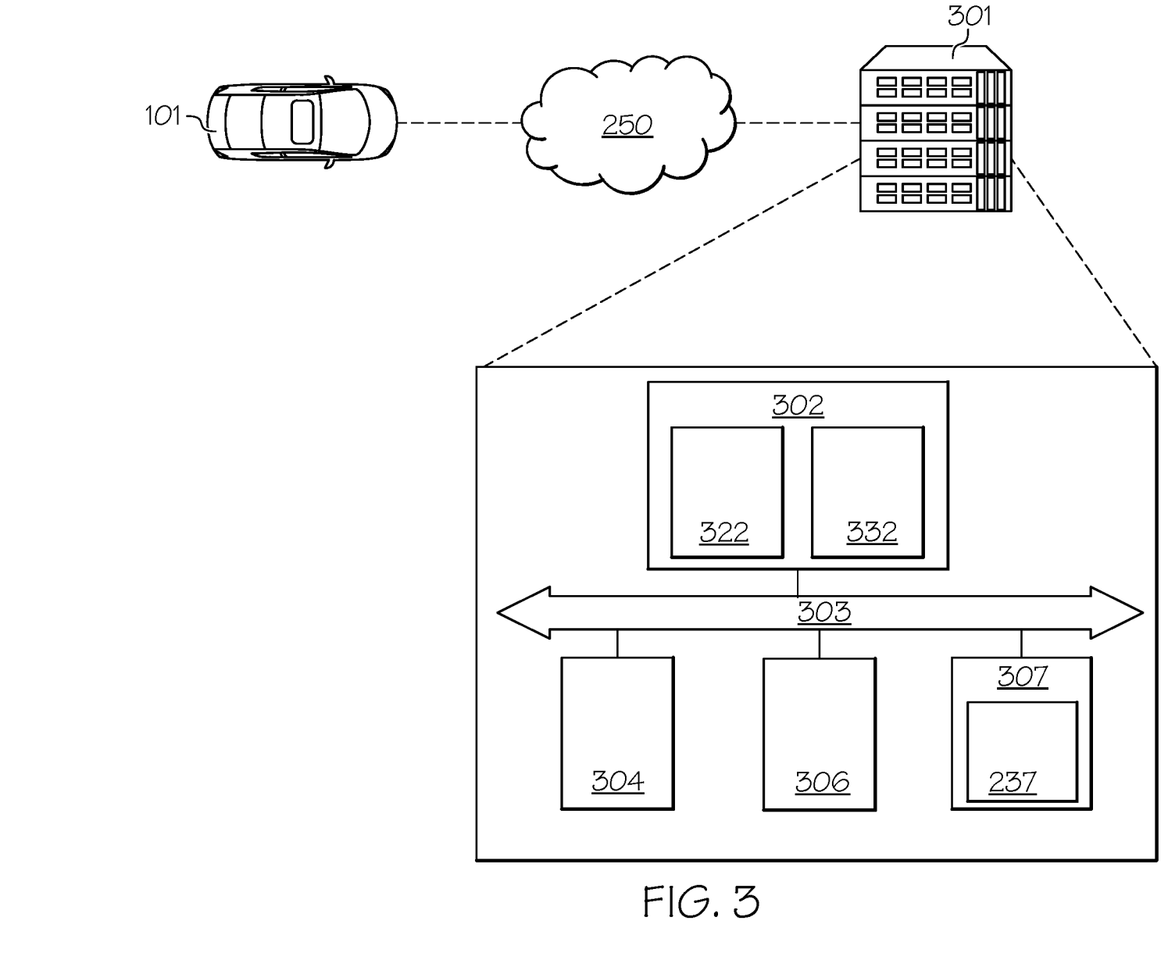
FIG. 3 schematically depicts example components of an edge server of the present disclosure, according to one or more embodiments shown and described herein.

FIGS. 2 and 3 schematically depict example components of the edge node selection system 100 for edge node selection. The edge node selection system 100 includes the inquiry vehicle 101 and may further include the edge node 301. While FIG. 2 depicts one inquiry vehicle 101, more than two inquiry vehicles 101 may be included in the edge node selection system 100. Similarly, while FIG. 3 depicts one inquiry vehicle 101 and one edge node 301, more than two inquiry vehicles 101 or more than two edge nodes 301 may communicate with each other.

Referring to FIG. 2, the inquiry vehicle 101 or the non-inquiry vehicle 103 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as, for example, electrical signals via a conductive medium, electromagnetic signals via air, optical signals via optical waveguides, and the like.

Accordingly, the communication path 203 may be formed from any medium that is capable of transmitting a signal such as, for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square-wave, vibration, and the like, capable of traveling through a medium.

The inquiry vehicle 101 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 204 along with the one or more memory components 202 may operate as a controller for the inquiry vehicle 101 or the non-inquiry vehicle 103.

The one or more memory components 202 may include the task and bid request module 222, the preference value module 232, and the performing edge node selection module 242. Each of the modules included in the memory components 202 may include, but not limited to, routines, subroutines, programs, objects, components, data structures, and the like for performing specific tasks or executing specific data types as will be described below. The data storage component 207 stores historical bid and task data 227, historical usage data 237, and data of operating inquiry vehicles 101.

The inquiry vehicle 101 may include the input/output hardware 205, such as, without limitations, a monitor, keyboard, mouse, printer, camera, microphone, speaker, and/or other device for receiving, sending, and/or presenting data. The input/output hardware 205 may include a user interface allowing the user to input or control the edge node selection system 100 regarding the inquiry tasks.

The inquiry vehicle 101 may include network interface hardware 206 for communicatively coupling the inquiry vehicle 101 to one or more edge nodes 301. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the inquiry vehicle 101 may transmit its data to the edge node 301. For example, the network interface hardware 206 of the inquiry vehicle 101 may transmit inquiry tasks, negotiation prices, bidding contract information, and receive bid information and task performance results, and relevant data, such as, without limitation, vehicle data, location data, updated local model data and the like to and from the edge node 301.

The inquiry vehicle 101 may be communicatively coupled to the edge node 301 by the wireless communication 250. In one embodiment, the wireless communication 250 may include one or more computer networks (e.g., a personal area network, a local area network, or a wide area network), cellular networks, satellite networks and/or a global positioning system and combinations thereof. Accordingly, the inquiry vehicle 101 can be communicatively coupled to the wireless communication 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near-field communication protocols. Suitable cellular networks include, but are not limited to, technologies such as LTE, WiMAX, UMTS, CDMA, and GSM.

Referring to FIG. 3, the edge node 301 includes one or more processors 304, one or more memory components 302, data storage component 307, server network interface hardware 306, and a local interface 303. The one or more processors 304 may be a controller, an integrated circuit, a microchip, a computer, or any other computing device. The one or more memory components 302 may comprise RAM, ROM, flash memories, hard drives, or any device capable of storing machine-readable and executable instructions such that the machine-readable and executable instructions can be accessed by the one or more processors 304. The one or more memory components 302 may include the resource allocation module 322 and the price module 332. The data storage component 307 stores the historical bid and task data 227. The resource allocation module 322 and the price module 332 may include, but are not limited to, routines, subroutines, programs, objects, components, data structures, and the like for performing specific tasks or executing specific data types as will be described below.

Figure 4:
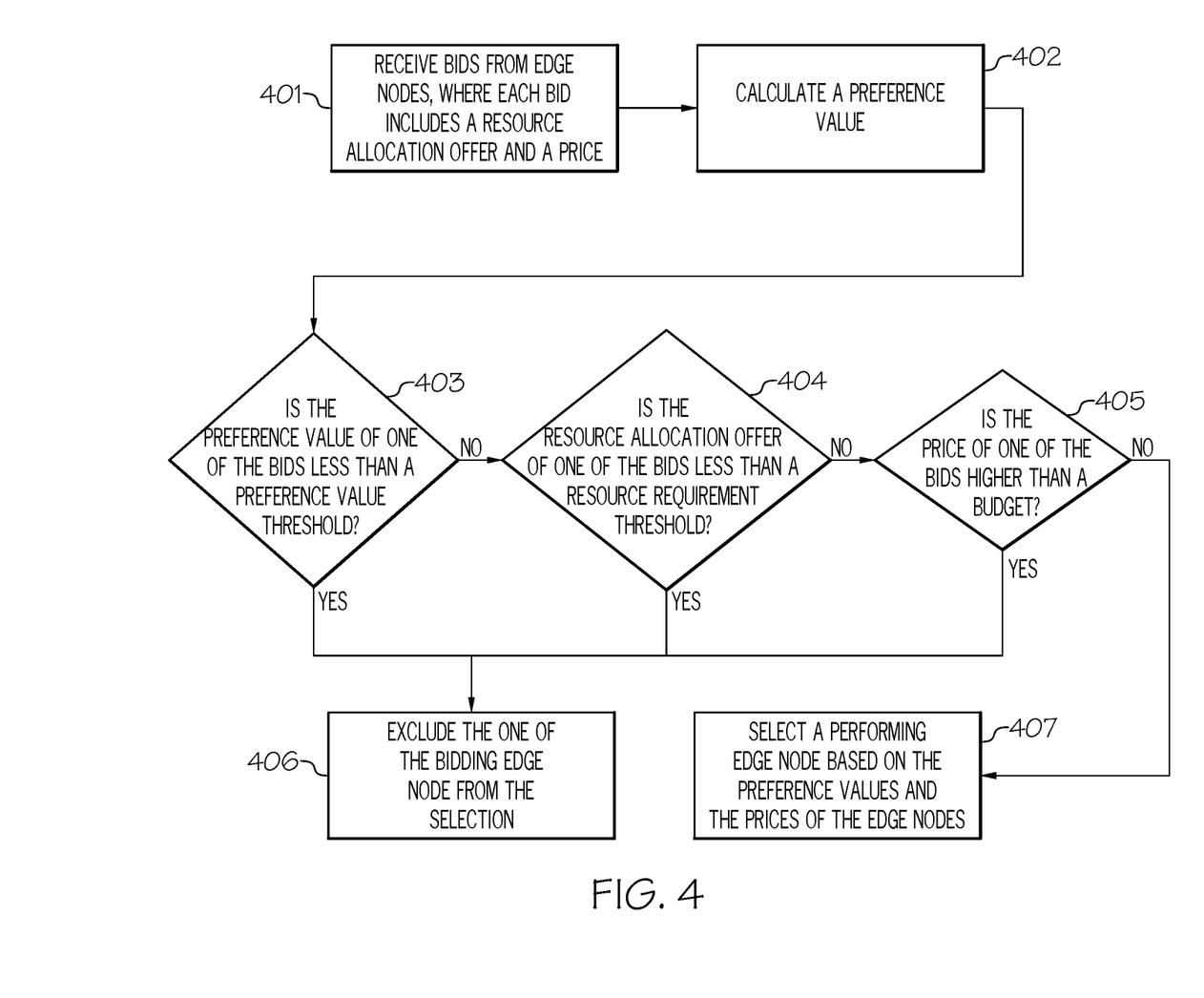
FIG. 4 depicts a flowchart for selecting an edge node for task performance of the present disclosure, according to one or more embodiments shown and described herein.

FIG. 4 depicts a flowchart for illustrative steps for edge node selection of the present disclosure. The edge node selection after sending requests of bidding to the edge nodes 301 may be operated using the various modules of the edge node selection system 100 among the inquiry vehicles 101 and the edge nodes 301 in accordance with the steps illustrated in FIG. 4. At block 401, the edge node selection system 100 may receive bids from edge nodes 301, where each bid includes a resource allocation offer and a price.

At block 402, the preference value module 232 may calculate a preference value. The preference value module 232 may calculate the preference value based on a weighted sum of preference factors for each bidding edge node. The preference factors are determined based on the resource allocation offer. The weight assigned to each preference factor is determined based on the task. For example, the preference value may be calculated following the equation:

$$\text{Preference value} = \text{Weight}_1 \times \text{Factor}_1 + \text{Weight}_2 \times \text{Factor}_2 \ldots + \text{Weight}_n \times \text{Factor}_n.$$

The preference factors may include one or more of latency, service time, computation capability, or quality of result generation. The preference factors further include usage history, the usage history. The usage history may include one or more of node assignment history or cached data of the inquiry vehicle 101 by the bidding edge nodes 301. Each weight of the corresponding factors may be according to the importance of each factor and relative priority based on the inquiry task.

The preference value equation allows for a dynamic and comprehensive evaluation, enabling the inquiry vehicle 101 to choose an edge node 301 that not only meets real-time performance criteria but also considers past interactions and cached data, contributing to a personalized and efficient navigation experience. The weights assigned to each factor allow for fine-tuning the desirability of different criteria based on the user's requirements. For example, as illustrated in FIG. 1, an inquiry vehicle 101 may seek an edge node 301 for real-time navigation assistance. The selection by the inquiry vehicle 101 may be influenced by factors such as latency, service time, computation capability, and the quality of result generation from the edge node 301. For example, the preference value module 232 may assign a factor of 0.3 to the latency, 0.2 to service time, 0.25 to computation capacity, 0.2 to the quality of result generation, and 0.05 to the usage history. Particularly, if the inquiry vehicle 101 has a historical assignment to a particular edge node 301 and that particular edge node 301 has cached relevant data for the inquiry vehicle 101's route preferences, the particular edge node 301 may receive a higher preference value.

At block 403, the performing edge node selection module 242 may determine whether the preference value of one of the bids is less than a preference value threshold. In some embodiments, the preference value threshold may be a preset value. In some embodiments, the preference value threshold may be generated or/and updated using the one of the machine learning algorithms based on the pre-training data and the historical bid and task data 227 and historical usage data 237, such as the selected performance edge node 301, the price, and the performance of the inquiry task. In response to a yes to the block 403, at block 406, the performing edge node selection module 242 may exclude the one of the bidding edge nodes 301 having the preference value of one of the bids less than a preference value threshold from the selection.

In response to a no to the block 403, at block 404, the performing edge node selection module 242 may determine whether the resource allocation offer of one of the bids less than a resource requirement threshold. In some embodiments, the resource requirement threshold may be a preset value. In some embodiments, the resource requirement threshold may be generated or/and updated using the one of the machine learning algorithms based on the historical bid and task data 227 and historical usage data 237, such as the selected performance edge node 301, the price, and the performance of the inquiry task. In response to a yes to the block 404, at block 406, the performing edge node selection module 242 may exclude the one of the bidding edge nodes 301 having the resource allocation offer of one of the bids less than a resource requirement threshold from the selection.

In response to a no to the block 404, at block 405, the performing edge node selection module 242 may determine whether the price of one of the bids is higher than a budget for the inquiry task. The budget may be generated based on the prices of similar inquiry tasks. In response to a yes to the block 405, at block 406, the performing edge node selection module 242 may exclude the one of the bidding edge nodes 301 having the price of one of the bids higher than the budget for the inquiry task from the selection.

In response to a no to the block 405, at block 407, the performing edge node selection module 242 may weigh the preference values against the prices for each bid received from the remaining edge nodes 301 and select a performing edge node 301 that meets the budget requirement and the performance efficiency requirement. For example, the performing edge node selection module 242 may select a second lowest price bid that is lower than the budget given that the lowest price bid provides less than half the allocated resource for the inquiry task.

Figure 5:
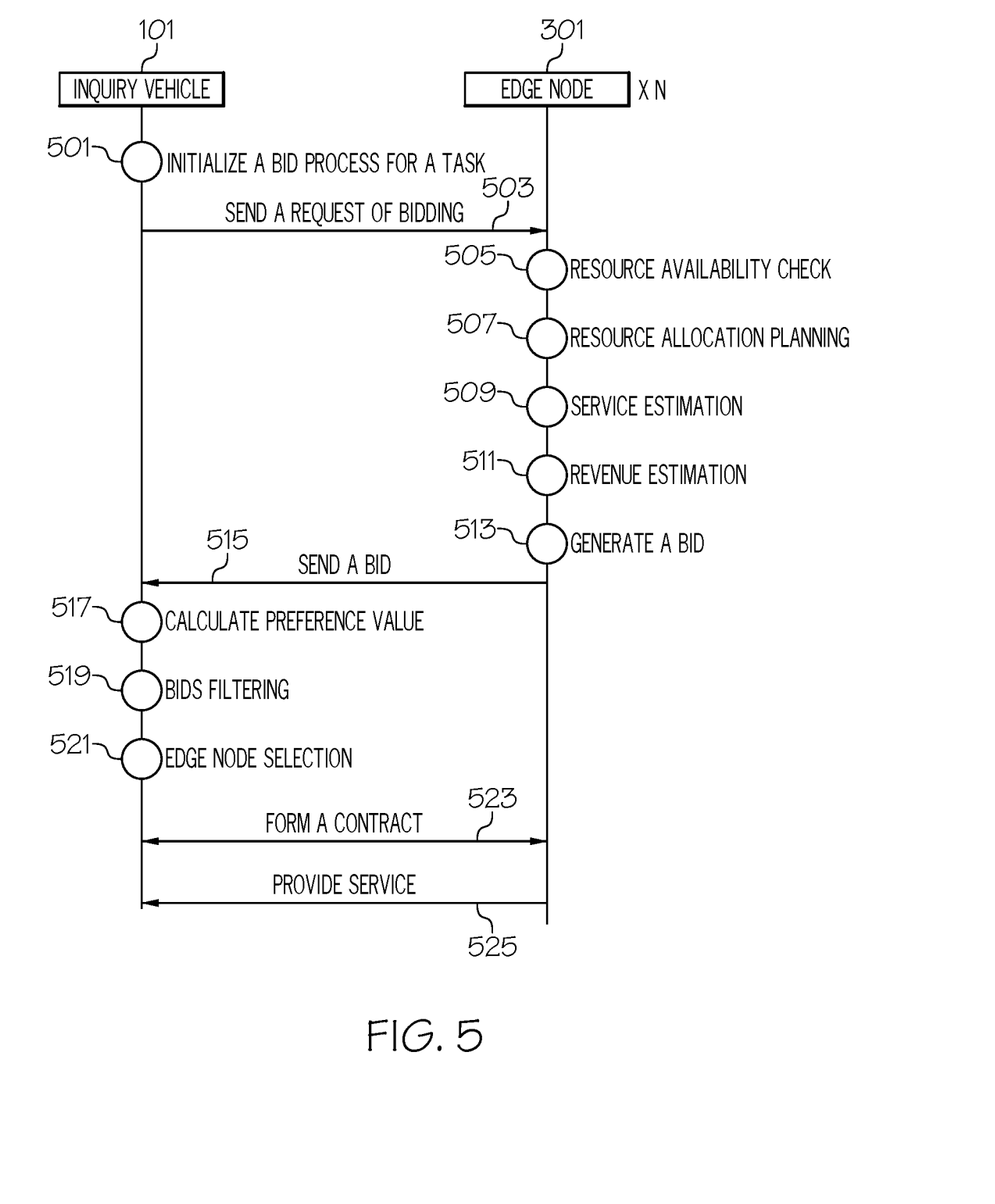
FIG. 5 depicts a sequence diagram for selecting an edge node for task performance of the present disclosure, according to one or more embodiments shown and described herein.

Referring to FIG. 5, a sequence diagram for edge node selection of multiple coordination requests among the inquiry vehicles 101 of the present disclosure is depicted. The edge node selection system 100 may include one or more inquiry vehicles 101 and one or more edge nodes 301 (e.g., n edge nodes, n=1, 2, 3, 4, . . . ).

In step 501, the task and bid request module 222 of the inquiry vehicle 101 may initialize a bid process for a task. For example, the one or more inquiry vehicles 101 may broadcast the inquiry tasks and requirements to the one or more edge nodes 301. In step 503, each inquiry vehicle 101 may send a request of bidding to all the edge nodes 301 regarding performing one or more tasks.

In step 505, each edge node 301 may conduct a resource availability check. Each edge node 301 may check its available resources and communicate and exchange with other edge nodes 301 regarding available resources of each other. In step 507, each edge node 301 may conduct a resource allocation planning for the inquiry tasks. Each edge node 301 may generate a resource allocation blueprint based on available resources. The resource allocation blueprint may include the resource allocation offers. In some embodiments, the generation of the resource allocation blueprint may be further based on the service estimation, revenue estimation, and task requirements.

In step 509, each edge node 301 may perform a service estimation. The edge nodes 301 may use the resource allocation module 322 to determine the allocation of resources, the expected results of the performance, such as, without limitations, the latency, and the accuracy of the performance. In some embodiments, the resource allocation module 322 may determine the allocated resource for a particular inquiry task using the one of the machine learning algorithms based on historical usage data 237, such as the price and the performance of the inquiry task. In step 511, each edge node 301 may conduct a revenue estimation for each inquiry task. The edge nodes 301 may determine the price for each task based on the resource allocation blueprint and expected revenue that may be generated through performing the task. In step 513, each edge node 301 may generate a bid for each inquiry task. Each bid may include a proposed allocation of resources for the corresponding inquiry task and a price for the proposed resource allocation. In step 515, each edge node 301 may send the bids to the inquiry vehicles 101.

In step 517, each inquiry vehicle 101 may calculate a preference value for each bid. The preference factors may be based on resource allocation offers sent from the edge nodes. The weights are based on the corresponding inquiry task. In step 519, each inquiry vehicle 101 may conduct bid filtering. For example, the inquiry vehicles 101 may remove the participators that cannot meet the requirements of the inquiry tasks, e.g., the preference value threshold, the resource requirement threshold, and the budget. In step 521, each inquiry vehicle 101 may select a performing edge node 301 based on the preference values and prices sent from the edge nodes 301. The preference factors may include one or more of latency, service time, computation capability, quality of result generation, or usage history. The usage history may include one or more of node assignment history or cached data of the inquiry vehicle 101 by the bidding edge nodes 301.

In step 523, each inquiry vehicle 101 may form a contract with the performing edge node 301. The contract may reflect the price offered by the performing edge node 301 and to be paid by the inquiry vehicle 101 in exchange for the task performance by the performing edge node 301. In some embodiments, one or more of the inquiry vehicle 101 may generate negotiation prices based on a usage history of one of the bidding edge nodes 301. The negotiation price may be lower than the price offered by the one of the bidding edge nodes 301. The inquiry vehicles 101 may send the negotiation price and the usage history to the one of the bidding edge nodes 301. The inquiry vehicle 101 may receive positive answers or negative answers from the one of the bidding edge nodes 301. In response to receiving the positive answers, the inquiry vehicles 101 may weigh the preference values of the one of the bidding edge nodes 301 against the negotiation price. The contract may reflect the negotiation price paid by the inquiry vehicle 101 in exchange for the task performance by the performing edge node 301. In response to receiving the negative answer, the inquiry vehicles 101 may weigh the preference values of the one of the bidding edge nodes 301 against the price offered by the one of the bidding edge nodes 301. The inquiry vehicle 101 may balance between the accepted negotiation price and the generated preference value of the bidding edge node 301 that accepts the negotiation price. Otherwise, when the negotiation price is not accepted by the bidding edge node 301, the inquiry vehicle 101 may still balance between the offered price from the bidding edge node 301 and the generated preference value of the bidding edge node 301. For example, an inquiry vehicle 101 may select a bidding edge node 301 that accepts a negotiation price, set at 20% below the price initially proposed by the same bidding edge node 301. The selection of the bidding edge node 301 is based on the fact that the generated preference value based on weighted factors (e.g., latency, service time, computation capability, or quality of result generation of the bidding edge node 301) is comparable to that of other bidding edge nodes 301, but the accepted negotiation price is lower than the offer prices by other bidding edge nodes 301. Had the selected bidding edge node 301 rejected the negotiation price, the inquiry vehicle 101 may not have selected the selected bidding edge node 301, considering that the offered price from the selected bidding edge node 301 exceeds the offer price from at least one other edge node 301 having similar generated preference value.

In step 525, the performing edge node 301 may provide the service by performing the inquiry task and sending the results of the performed task to the corresponding inquiry vehicle 101. The inquiry vehicle 101 may operate the vehicle based on the result of the task performed by the performing edge node.

Figure 6:
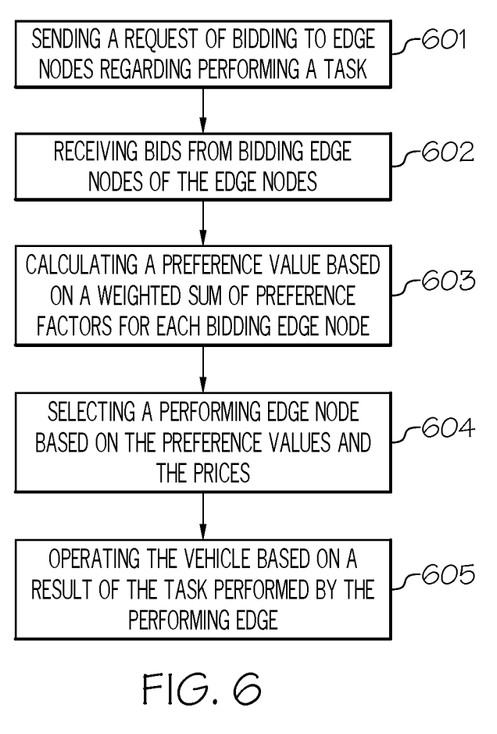
FIG. 6 depicts a flowchart for the edge node selection and vehicle operation based on a result of the task performed by the selected edge node of the present disclosure, according to one or more embodiments shown and described herein.

FIG. 6 depicts a flowchart for illustrative steps for the method of edge node selection of the present disclosure. At block 601, the present method sends a request of bidding to edge nodes 301 regarding performing a task. At block 602, the method for selecting an edge node 301 includes receiving one or more bids from one or more bidding edge nodes of the edge nodes 301. Each bid may include a resource allocation offer and a price.

At block 603, the present method calculates a preference value based on a weighted sum of preference factors for each bidding edge node. The preference factors are determined based on the resource allocation offer, and the weight assigned to each preference factor is determined based on the task.

In some embodiments, the preference factors may include one or more of latency, service time, computation capability, or quality of result generation. The preference factors may further include usage history. The usage history includes one or more of node assignment history or cached data of the inquiry vehicle 101 by the bidding edge nodes 301.

At block 604, the present method selects a performing edge node based on the preference values and the prices. In some embodiments, the selection of the performing edge node 301 may further include weighing the preference value against the price for each bidding edge node 301. The budget is at least partially determined based on a priority of the inquiry task.

In some embodiments, the selection of the performing edge node 301 may further include determining whether the preference value is less than a preference value threshold for each bidding edge node, in response to determining that the preference value of one of the bidding edge node 301 is less than the preference value threshold, excluding the one of the bidding edge node 301 from the selection. In some embodiments, the selection of the performing edge node 301 may further include determining whether the resource allocation offer is below a resource requirement threshold for the task for each bidding edge nodes 301, and in response to determining that the allocated resource offer received from one of the edge nodes 301 is below the resource requirement threshold, excluding the one of the bidding edge nodes 301 from the selection. In some embodiments, the selection of the performing edge node 301 may further include determining whether the prices are higher than a budget, and in response to determining that the price sent from one of the bidding edge nodes 301 is higher than the budget, excluding the one of the bidding edge nodes 301 from the selection.

In some embodiments, the selection of the performing edge node 301 may further include generating a negotiation price based on a usage history of one of the bidding edge nodes 301, sending the negotiation price and the usage history to the one of the bidding edge nodes 301, receiving a positive answer or a negative answer from the one of the bidding edge nodes 301, in response to receiving the positive answer, weighing the preference values of the one of the bidding edge nodes 301 against the negotiation price, and in response to receiving the negative answer, weighing the preference values of the one of the bidding edge nodes 301 against the price. The negotiation price may be lower than the price offered by the one of the bidding edge nodes 301. The usage history may include one or more of node assignment history or cached data of the inquiry vehicle 101 by the one of the bidding edge nodes 301.

In some embodiments, the selection of the performing edge node may be further based on whether the performing edge node has cached data of the inquiry vehicle 101.

At block 605, the method for selecting an edge node 301 includes operating the vehicle based on a result of the task performed by the performing edge node. For example, the processor of the vehicle controls the vehicle such that the vehicle autonomously drives based on the result of task, for example, object detections, object classifications, distances to objects, and the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for selecting an edge node comprising a processor operable to:
   send a request of bidding to edge nodes regarding performing a task for an inquiry vehicle;
   receive one or more bids from one or more bidding edge nodes of the edge nodes, wherein each bid comprises a resource allocation offer and a price;
   calculate a preference value based on a weighted sum of preference factors for each bidding edge node, wherein the preference factors are determined based on the resource allocation offer, and the weight assigned to each preference factor is determined based on the task;
   select a performing edge node based on the preference values and the prices; and
   operate the inquiry vehicle based on a result of the task performed by the performing edge node.

2. The system of claim 1, wherein the preference factors comprise one or more of latency, service time, computation capability, or quality of result generation.

3. The system of claim 2, wherein the preference factors further comprise usage history, the usage history comprising one or more of node assignment history or cached data of the inquiry vehicle by the bidding edge nodes.

4. The system of claim 1, wherein the selection of the performing edge node further comprises weighing the preference value against the price for each bidding edge node.

5. The system of claim 4, wherein the selection of the performing edge node further comprises:
   determining whether the preference value is less than a preference value threshold for each bidding edge node; and
   in response to determining that the preference value of one of the bidding edge nodes is less than the preference value threshold, excluding the one of the bidding edge nodes from the selection.

6. The system of claim 1, wherein the selection of the performing edge node further comprises:
   determining whether resource allocation offer is below a resource requirement threshold for the task for each bidding edge nodes; and
   in response to determining that the allocated resource offer received from one of the edge nodes is below the resource requirement threshold, excluding the one of the bidding edge nodes from the selection.

7. The system of claim 1, wherein the selection of the performing edge node further comprises:
   determining whether the prices are higher than a budget; and
   in response to determining that the price sent from one of the bidding edge nodes is higher than the budget, excluding the one of the bidding edge nodes from the selection.

8. The system of claim 7, wherein the budget is at least partially determined based on a priority of the task.

9. The system of claim 1, wherein the selection of the performing edge node further comprises:
   generating a negotiation price based on a usage history of one of the bidding edge nodes, wherein the negotiation price is lower than the price offered by the one of the bidding edge nodes;
   sending the negotiation price and the usage history to the one of the bidding edge nodes;
   receiving a positive answer or a negative answer from the one of the bidding edge nodes;
   in response to receiving the positive answer, weighing the preference values of the one of the bidding edge nodes against the negotiation price;
   in response to receiving the negative answer, weighing the preference values of the one of the bidding edge nodes against the price offered by the one of the bidding edge nodes.

10. The system of claim 9, wherein the usage history comprises one or more of node assignment history or cached data of the inquiry vehicle by the one of the bidding edge nodes.

11. The system of claim 1, wherein the selection of the performing edge node is further based on whether the performing edge node has cached data of the inquiry vehicle.

12. A method for selecting an edge node comprising:
    sending a request of bidding to edge nodes regarding performing a task for an inquiry vehicle;
    receiving one or more bids from one or more bidding edge nodes of the edge nodes, wherein each bid comprises a resource allocation offer and a price;
    calculating a preference value based on a weighted sum of preference factors for each bidding edge node, wherein the preference factors are determined based on the resource allocation offer, and the weight assigned to each preference factor is determined based on the task;
    selecting a performing edge node based on the preference values and the prices; and
    operating the inquiry vehicle based on a result of the task performed by the performing edge node.

13. The method of claim 12, wherein the preference factors comprise one or more of latency, service time, computation capability, quality of result generation, or usage history, wherein the usage history comprises one or more of node assignment history or cached data of the inquiry vehicle by the bidding edge nodes.

14. The method of claim 12, wherein the selection of the performing edge node further comprises:
- determining whether the preference value is less than a preference value threshold for each bidding edge node;
- in response to determining that the preference value of one of the bidding edge node is less than the preference value threshold, excluding the one of the bidding edge nodes from the selection;
- determining whether resource allocation offer is below a resource requirement threshold for the task for each bidding edge nodes; and
- in response to determining that the allocated resource offer received from one of the edge nodes is below the resource requirement threshold, excluding the one of the bidding edge nodes from the selection.

15. The method of claim 12, wherein the selection of the performing edge node further comprises:
- generating a negotiation price based on a usage history of one of the bidding edge nodes, wherein the negotiation price is lower than the price offered by the one of the bidding edge nodes;
- sending the negotiation price and the usage history to the one of the bidding edge nodes;
- receiving a positive answer or a negative answer from the one of the bidding edge nodes;
- in response to receiving the positive answer, weighing the preference values of the one of the bidding edge nodes against the negotiation price;
- in response to receiving the negative answer, weighing the preference values of the one of the bidding edge nodes against the price offered by the one of the bidding edge nodes.

* * * * *

UNITED STATES PATENT AND TRADEMARK OFFICE
CERTIFICATE OF CORRECTION

Page 1 of 2

PATENT NO. : 12,395,411 B1
APPLICATION NO. : 18/433759
DATED : August 19, 2025
INVENTOR(S) : Dawei Chen et al.

It is certified that error appears in the above-identified patent and that said Letters Patent is hereby corrected as shown below:

On the Title Page

Item (73), assignee 2, City, delete "Aichi-Ken" and insert --Toyota-shi Aichi-Ken--, therefor.

In the Specification

In Column 1, Line(s) 24, after "node", delete "include" and insert --includes--, therefor.

In Column 1, Line(s) 48, after "prices", delete ";" and insert --,--, therefor.

In Column 3, Line(s) 41, after "streets,", delete "expressway" and insert --expressways--, therefor.

In Column 3, Line(s) 67, delete "inquire vehicle" and insert --inquiry vehicle--, therefor.

In Column 4, Line(s) 49, delete "needs" and insert --need--, therefor.

In Column 5, Line(s) 7, delete "inquire vehicle" and insert --inquiry vehicle--, therefor.

In Column 5, Line(s) 21, delete "tan h function" and insert --tanh function--, therefor.

In Column 5, Line(s) 47, delete "general adversarial network" and insert --generative adversarial network--, therefor.

In Column 5, Line(s) 50, delete "variation autoencoder" and insert --variational autoencoder--, therefor.

In Column 7, Line(s) 38, delete "one or more processor" and insert --one or more processors--, therefor.

In Column 7, Line(s) 46, delete "include, but not limited to" and insert --include, but is not limited

Signed and Sealed this
Fourteenth Day of October, 2025

John A. Squires
*Director of the United States Patent and Trademark Office*

CERTIFICATE OF CORRECTION (continued)
U.S. Pat. No. 12,395,411 B1 to--, therefor.

In Column 9, Line(s) 57, after "bids", insert --is--.

In the Claims

In Column 14, Line 3, Claim 6, after "whether", insert --the--.

In Column 14, Line 4 & 5, Claim 6, delete "each bidding edge nodes" and insert --each bidding edge node--, therefor.

In Column 15, Line 4, Claim 14, delete "each bidding edge nodes" and insert --each bidding edge node--, therefor.

In Column 15, Line 9, Claim 14, after "whether", insert --the--.